United States Patent [19]

Limaye et al.

[11] Patent Number: 4,801,566
[45] Date of Patent: Jan. 31, 1989

[54] LOW EXPANSION CERAMIC

[75] Inventors: Santosh Y. Limaye, Salt Lake City, Utah; Dinesh K. Agrawal, State College, Pa.; Herbert A. McKinstry, State College, Pa.; Rustum Roy, State College, Pa.

[73] Assignee: Pennsylvania State University, State College, Pa.

[21] Appl. No.: 25,700

[22] Filed: Mar. 13, 1987

[51] Int. Cl.$^4$ .............................................. C04B 35/48
[52] U.S. Cl. ...................................... 501/104; 501/94; 501/102; 501/123; 501/134; 501/135; 423/306
[58] Field of Search ................ 501/94, 102, 104, 123, 501/134, 135; 423/306

[56] References Cited

U.S. PATENT DOCUMENTS

| 4,526,844 | 7/1985 | Yoldas et al. | 501/104 |
| 4,587,172 | 5/1986 | Roy et al. | 501/102 |
| 4,675,302 | 6/1987 | Roy et al. | 501/123 |

OTHER PUBLICATIONS

Oota and Yamai, Thermal Expansion Behavior of $NaZr_2(PO_4)_3$-Type Compounds, J. Am. Ceram. Soc. 69 [1] 1–6 (1986).

Alamo and Roy, Crystal Chemistry of the $NaZr_2(PO_4)_3$, NZP or CTP, Structure Family, J. Mater. Sci. 21, 444–450 (1986).

Agrawal and Stubican, Synthesis and Sintering of $Ca_{0.5}Zr_2P_3O_{12}$–A Low Thermal Expansion Material, Mat. Res. Bull. 20, 99–106 (1985).

Primary Examiner—William R. Dixon, Jr.
Assistant Examiner—David M. Brunsman
Attorney, Agent, or Firm—Barry S. Bissell

[57] ABSTRACT

Crystalline solid solutions and diphasic mixtures having a composition of $Ca_{1-x}M_xZr_4P_6O_{24}$, where M is Ba and/or Sr and X is between about 0.25 and 0.75, have been produced which display both low anisotropy and near zero bulk thermal expansion behavior.

4 Claims, 3 Drawing Sheets

LOW EXPANSION CERAMIC

This invention was made with Government support under AFOSR 83-0291 awarded by the Air Force. The Government has certain rights in this invention.

BACKGROUND

For many years effort has been made to develop low thermal expansion ceramic materials for various applications, such as structural materials, cooking ware, space-craft, substrates for optical mirrors, etc. Materials like β-spodumene, cordierite, β-eucryptite, vitreous silica, borosilicates and other materials have been used for low thermal expansion applications. In a 1984 review article, F. A. Hummel has summarized most of the low/ultra-low thermal expansion materials [Interceram, 33 (6), pgs. 27-30].

References generally regard high expansion materials as having $\alpha > 8 \times 10^{-6}$, intermediate expansion materials as having $2 \times 10^{-6} < \alpha 8 \times 10^{-6}$, and low or negative expansion materials as having $\alpha < 2 \times 10^{-6}$. For example, high expansion materials include BeO, MgO, $Al_2O_3$ (corundum) and stabilized zirconia. Intermediate expansion materials include $SnO_2$, SiC, $Si_3N_4$, mullite, zircon, $ZrTiO_4$. And low expansion materials include fused silica, $Nb_2O_5$, $Ta_2WO_8$, aluminum titanate and cordierite.

Recently, investigation has taken place in the $Na_{1+x}Zr_2P_{3-x}Si_xO_{12}$ and the $NaZr_2P_3O_{12}$ (or Sljukic, et al. were the first to synthesize NZP-type materials (Preparation and Crystallographic Data of Phosphates with Common Formula $M^IM^{IV}(PO_4)_3$; $M_I$=Li, Na, K, Rb, Cs; $M^{IV}$=Zr, Hf; Croatia Chemica Acta, 39, pgs. 145-148, 1967). They grew single crystals of $M^IM_2(PO_4)_3$ ($M^I$=Na, Li, K, Rb, Cs; M=Zr, Hf) by heating a mixture of alkali metal phosphate and tetravalent metal oxide. The crystal structure of NZP family of materials consists of three-dimensional hexagonal skeleton network of $PO_4$ tetrahedra sharing corners with $ZrO_6$ octahedra. Each $ZrO_6$ octahedron is connected to six $PO_4$ tetrahedra, while each tetrahedron is linked to four octahedra. The basic unit of the network consists of two octahedra and three tetrahedra corresponding to $(Zr_2P_3O_{12})^-$; these units in turn are so connected as to form ribbons along the c-axis, which are joined together perpendicular to the c-axis by $PO_4$ tetrahedra to develop three-dimensional rigid network. The articulation of these ribbons and chains creates structural holes or interstitial vacant sites in the structure which are normally occupied by Na and/or other substituting ions. There are in fact four such interstitial sites per formula unit of which some are empty depending upon the particular substituion/charge compensation scheme.

The most important and extraordinary feature of NZP structure is its exceptional flexibility towards ionic substitution at various lattice sites. This is due to the strong bonds between Zr—O and P—O creating strong polyhedra. The $PO_4$ tetrahedra and $ZrO_6$ octahedra share corners which build up a flexible but stable skeleton network. Na atoms fill in octahedral holes. The chains or ribbons along (001) direction are packed hexagonally. The $[Zr_2(PO_4)_3]^{1-}$ skeleton creates three important structural "holes", the octahedral one (at three fold inversion axis) normally occupied by Na, the prismatic one formed by the phosphate tetrahedra which is normally vacant, and three more octahedral ones (at the center of symmetry), that set up a three-dimensional network.

Alamo and Roy have described the ionic substitution in detail in Crystal Chemistry of the $NaZr_2$—$(PO_4)_3$, NZP or CTP Structure Family J. Mat. Sci. 21, pgs. 444-450 (1986). The standard structural formula for the structure is described as follows: $M'_1{}^{VI}M''_3{}^XA_2{}^{VI}B_3{}^{IV}O_{12}$. Sodium goes into M' sites and the M'' sites are normally vacant. The following lists the different elements which are substituted at different sites:

M'—Li, Na, K, Rb, Cs, Mg, Ca, Sr, Ba, H, $NG_4$, Cu, etc.
M''—Na, K
A—Sn, Ge, Ti, Zr, Hf, Al, Cr, Nb, Ta, rare earths, Fe, Sc, V, etc.
B—P, Si, Al, S, etc.

Substitution can be complete or partial, leading to crystalline solutions of intermediate composition.

An article by Agrawal and Stubican in Material Research Bulletin, v. 20, pages 99-106 (1985) discusses the sintering of $Ca_{0.5}Zr_2P_3O_{12}$. Oota and Yamai characterize the expansions of pure NZP materials in J. Am. Cer. Soc., v. 69 (1), pages 1-6 (1986).

SUMMARY OF THE INVENTION

NZP is a new class of materials which exhibits rather low thermal expansion. These materials have a stable network stucture and a rare combination of the linkage between a tetrahedra on two fold crystallographic axis and the octahedra on the three fold axis. The rigidity of the network is acheived by the corner sharing. In order to maintain this rigidity when there is temperature increase, the polyhedra have to perform constrained rotations, giving high anisotropy in the thermal expansion (negative expansion along one axis and positive expansion along the other axis).

The present invention is a particular crystalline solid solution of CaZP and Ba or SrZP. It was discovered that the Ca and Ba or Sr materials show opposite anisotropy in thermal expansion, i.e., the sign of the expansion along their respective "a" and "c" axes are opposite. Not only the anisotropy, but the bulk thermal expansions (measured by dilatometry) were opposite. Solid solutions therefore showed both near zero bulk thermal expansion and very low anisotropy compared with prior NZP materials. In addition, diphasic mixtures of CaZP and SrZP or BaZP also show a similar behavior.

In particular, the invention comprises (1) a single-phase, crystalline solid solution of $Ca_{1-x} M_x Zr_4P_6O_{24}$ wherein M is Ba and/or Sr and x is between about 0.25 and 0.75, and (20 diphasic mixtures of $CaZr_4P_6O_{24}$ with $SrZr_4P_6O_{24}$ or $BaZr_4P_6O_{24}$ with the formula $(1-x)CaZr_4P_6O_{24} + xMZr_4P_6O_{24}$, where M is Sr and/or Ba and x is between 0.25 and 0.75. Substitution of from 0.25 to 0.5 of the calcium is preferred. Strontium is preferred over barium as a substitutent if a higher density product is desired.

DESCRIPTION OF THE PREFERRED EMBODIMENTS

Thermal expansion is due basically to the presence of anharmonic vibrations of atoms about their equilibrium positions in the lattice. The normal thermal expansion due to the anharmonic vibrations of the atoms about their equilibrium positions in the lattice for these materials are superseded by the coupled rotations of the phosphate tetrahedra and the zirconia octahedra. The coupling causes the anisotropic behavior. On the microcrystalline level this anisotropy in axial thermal expansions can lead to microcracking. In bodies having randomly oriented anisotropic crystals, the bulk thermal expansion can be very low since it measures the average thermal expansion of the crystals.

The present invention is a range of solid solution compositions and diphasic mixtures which have both very low bulk thermal expansion and very low anisotropy. These compositions are, therefore, resistant to thermal shock on a micro and macro level and are suitable for high strength applications experiencing wide temperature excursions.

The inventive compositions are of the general formula $Ca_{1-x}M_xZr_4P_6O_{24}$ or $(1-x)CaZr_4P_6O_{24} + xMZr_4P_6O_{24}$, where M is Ba and/or Sr and x is between about 0.25 and 0.75. The compositions may be made by various known ceramic processing techniques. Solid state reaction and sol-gel were found to be two suitable methods. The procedures are described schematically in FIGS. 1 and 2 respectively. The processes can be carried out as follows.

Figure 1:
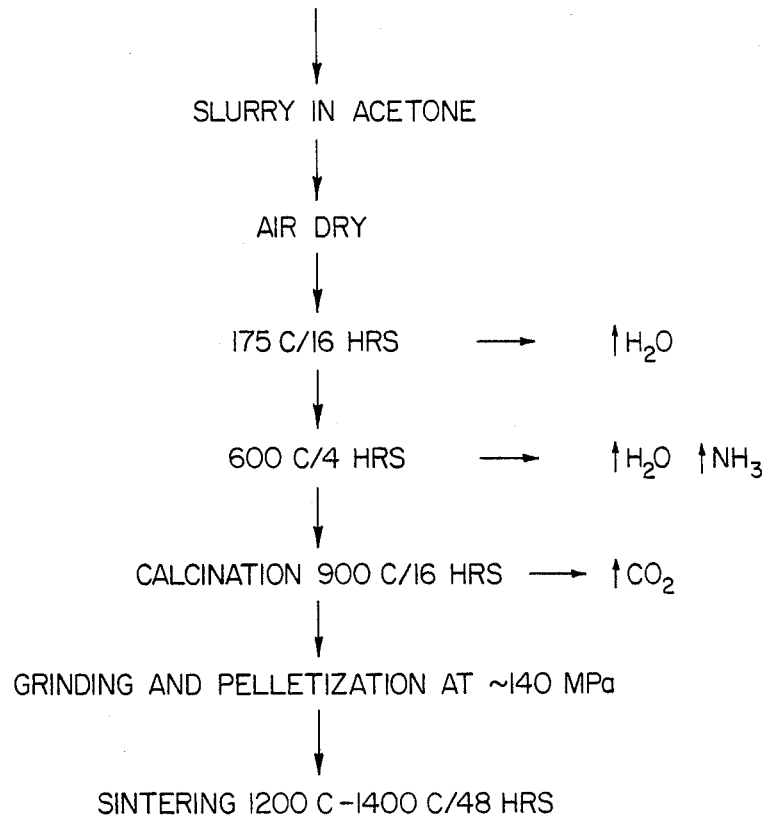
FIGS. 1 and 2 are flow charts of two processes for producing the novel material.

Solid State (FIG. 1)

The loss on ignition should be taken in account in weighing a batch of precursor materials, so that the final product has the correct stoichiometry. The mixing of these oxides can be carried out in a mullite mortar and pestle, for example, with acetone as a mixing media, after which the mixture is dried quickly in air at room temperature. Before the calcination step, this mixture of precursors can be heat treated at 175° and 600° C. in a glass beaker to form a hard crust. The residue is ground to a powder and calcined at 900° C. for sixteen hours. The step of calcination was found to be important. If eliminated, a compact of the powder obtained after heating at 600° goes through a large volume shrinkage during sintering, and as a result, develops cracks during sintering. After calcination, the x-ray diffraction shows that the powder consists of zirconium pyrophosphate ($Zr-P_2O_7$) and an amorphous phase (probably some complex of the alkaline earth cation). Sintering time increases with increasing atomic number of the alkaline earth cation. Since the mobility of the cation is lowered as the atomic number increases, longer holding times and higher temperatures are required. The time generally required for sintering of $CaZr_4P_6O_{24}$, $SrZr_4P_6O_{24}$, and $BaZr_4P_6O_{24}$ are 48, 48-72, and 196 hours respectively at 1200° C.

Figure 2:
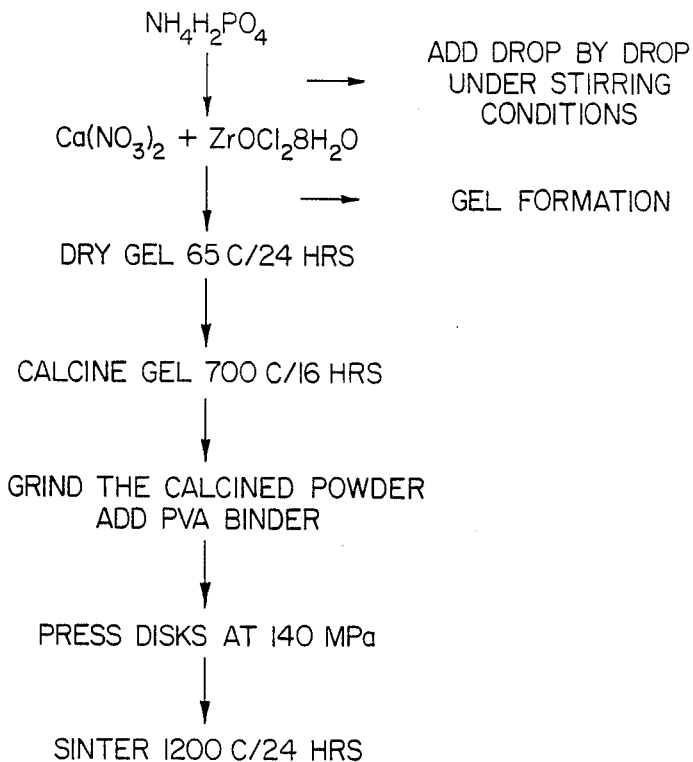

Sol-gel (FIG. 2)

Aqueous solutions of $M(NO_3)_2$ (M=Ca, Sr, Ba), $ZrOCl_2.8H_2O$, $NH_4H_2PO_4$ may be analyzed by atomic absorption spectrometry for the determination of accurate concentrations of cations. The solution of $ZrOCl_2.8H_2O$ is added to $M(NO_3)_2$ and then $NH_4H_2PO_4$ solution should be added drop by drop to this mixture, under constant stirring conditions. It is observed that the addition of the first drop of $NH_4H_2PO_4$ forms a milky cluster in the solution (probably due to the formation of some complex of the zirconium phosphate) and as the amount of $NH_4H_2PO_4$ is increased, the solution becomes more milky and viscous. Any change in the order of mixing results in second phase ($ZrP_2O_7$) formation during sintering. When $ZrOCl_2.8H_2O$ is added to $NH_4H_2PO_4$, it forms a milky solution. If $M(NO_3)_2$ is added after this step, $M(NO_3)_2$ does not mix well with the milky solution.

The actual sol-gel process consists of the formation of sol particles followed by coagulation or gelation into a three-dimensional structure. The process of sol-gel refers to the transformation of the suspension of sol particles from a liquid-like state, which will not support shear stresses, to an elastic material resistant to shear stresses in any of its three dimensions.

The above mixture can be stabilized at various pH values as a suspension. A gel is formed by drying at 65° C./24 hours. The surface area for all the dried gel samples is in the region of 80 to 90 $m^2/gm$. Typical particle size is approximately 0.03 $\beta m$. This dried gel is calcined at 700° C.–1200° C. for 16-24 hours.

The major advantages of sol-gel method over the solid state reaction technique are the microhomogeneity, the high surface area of the dried gel yielding higher crystallinity at much lower sintering times and temperatures, and resulting into high densification of the sintered samples.

Several compositions were formulated using the above methods. Measurement of thermal expansions were made using high temperature x-ray diffratometry for axial or directional coefficients and dilatometry for bulk coefficients.

The dilatometric measurements from 25° C. to 500° C. were made on rectangular bars (approximately 2 cm ×0.5 cm ×0.5 cm) cut from sintered pellets using a HARROP Dilatometric Analyzer. All six sides were polished or cut so that the opposite surfaces were parallel to each other. The samples which contained considerable porosity were polished on 4-O paper without any media, and the dense samples were cut using a diamond saw. The dilatomeric measurements were recorded during heating (rate =1° C./min.) as well as cooling cycles. For each composition (sample) at least two measurements were made to ensure the reproducibility of the results.

The Picker TM X-ray diffractometer was interfaced with an Apple II TM microcomputer to determine the precise X-ray peak positions. This diffractometer could scan a sample from $2\theta$ value of 0° to 164°. CuK$\alpha$ radiation was used. A machine language program was utilized to control the scanning. A scanning interval as low as 0.005° could be obtained and the time between the steps could be adjusted to suit the needs. The sample was suspended in a furnace and the measurement taken over the range of 23°–500° C.

Samples of $MZr_4P_6O_{24}$ where M is Ca, Sr or Ba were prepared using both the solid state and sol gel methods. Axial thermal expansions were determined by x-ray diffractometry over 23°–500° C. Bulk thermal expansions were measured by dilatometry over 25°–500° C. and were also calculated from the axial measurements using the formula $$\alpha_{bulk} = \frac{(2\alpha_a + \alpha_c)}{3}.$$

The results are shown in Table 1. It is believed that these values of $\alpha$ would remain unchanged up to 1000° C.

TABLE 1

Axial and Bulk Thermal Expansion Coefficients ($\times 10^{-6}/°C.$), RT — 500° C.

|  | $\bar{a}$ axis | $\bar{c}$ axis | Bulk Actual (diffractometry) | Bulk Calculated (x = ray) |
|---|---|---|---|---|
| Ca Zr$_4$P$_6$O$_{24}$ | −5.1 | 9.9 | −2.11 | −0.1 |
| Sr Zr$_4$P$_6$O$_{24}$ | 3.6 | −1.2 | 3.16 | 2.0 |
| Ba Zr$_4$P$_6$O$_{24}$ | 5.4 | −1.8 | 3.37 | 3.0 |

It is seen that the axial thermal expansion of CaZr$_4$P$_6$O$_{24}$ was negative along the $\bar{a}$ axis and positive along the $\bar{c}$ axis between room temperature and 500° C. However, exactly the opposite behavior was demonstrated by SrZr$_4$P$_6$O$_{24}$ and BaZr$_4$P$_6$O$_{24}$ (i.e. positive thermal expansion along $\bar{a}$ axis and negative thermal expansion along $\bar{c}$ axis).

Densities of the samples, determined by water immersion technique (modified ASTM 373-56), are shown in Table 2.

TABLE 2

Densities of MZr$_4$P$_6$O$_{24}$

| Composition | Theoretical Density (gm/cc) | Measured Density (gm/cc) Archimedes | Percent Theoretical Density |
|---|---|---|---|
| Solid State Reaction Technique | | | |
| CaZr$_4$P$_6$O$_{24}$ | 3.20 | 2.60 | 81.3% |
| SrZr$_4$P$_6$O$_{24}$ | 3.33 | 2.61 | 78.4% |
| BaZr$_4$P$_6$O$_{24}$ | 3.44 | 2.51 | 73.0% |
| Sol-Gel Technique | | | |
| CaZr$_4$P$_6$O$_{24}$ | 3.20 | 3.15 | 98.4% |
| SrZr$_4$P$_6$O$_{24}$ | 3.33 | 3.25 | 97.6% |
| Ca$_{0.5}$Sr$_{0.5}$Zr$_4$P$_6$O$_{24}$ | 3.26 | 3.22 | 98.8% |

In light of the fact that the Ba and Sr materials have the opposite bulk expansion and anisotropy from the Ca materials, a new family of crystalline solid solutions and diphasic mixtures were designed to average the properties and approach zero anisotropy. The family comprises solid solution and/or mixtures of CaZr$_4$P$_6$O$_{24}$ with either or both of BaZr$_4$P$_6$O$_{24}$ and SrZr$_4$P$_6$O$_{24}$. The opposite bulk expansions and opposite anisotropy appear to lead to a pure single phase or diphasic crystalline material with a structure in which the axial expansivities are geometric addition of the individual expansivities of the unsubstituted CaZr$_4$P$_6$O$_{24}$ and the Ba and/or Sr zirconium phosphates.

To prove the theory, a crystalline solid solution with composition (Ca$_{0.5}$Sr$_{0.5}$)Zr$_4$P$_6$O$_{24}$ and a mixture of 50/50 CaZP and SrZP were produced by the sol gel method. High temperature X-ray diffraction was used to determine that the anisotropy did cancel. The $\bar{a}$ and $\bar{c}$ expansions were found to be $-0.712 \times 10^{-6}/°C$ and $1.18 \times 10^{-6}/°C$, respectively. The calculated bulk expansion was $0.81 \times 10^{-6}/°C$, but the actual bulk expansion by dilatometers was $1.68 \times 10^{-6}/°C$. This surprising difference in the dilatometric measurements and the high temperature X-ray diffraction results may be explained by considering the elastic constraints between the grains when the material shows thermal expansion anisotropy. When two grains of a material having large anistropy of thermal expansion, are joined together with different orientations, then the internal stresses will be enhanced and will have elastic constraints. This affects the bulk thermal expansion of the ceramic body and will be different from that of the strain free powder.

Figure 3:
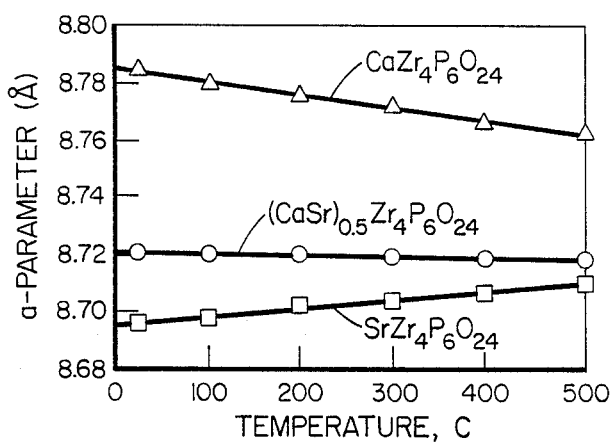
FIGS. 3 and 4 are graphs of the variations in $\bar{a}$ and $\bar{c}$ axes with temperature, respectively, of the novel solid solutions and their pure constituents.
Figure 4:
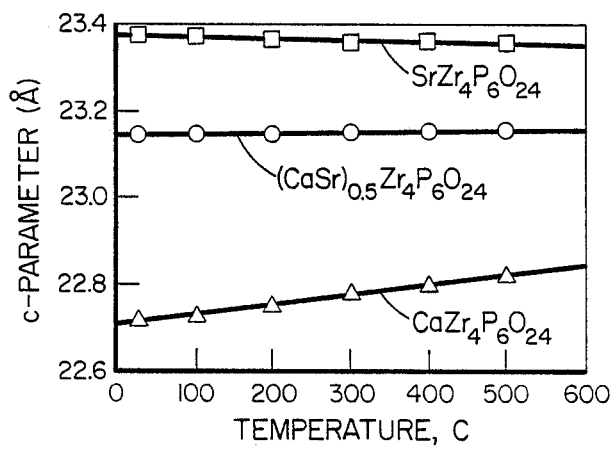

A comparison of the unit cell expansions of CaZr$_4$P$_6$O$_{24}$, SrZr$_4$P$_6$O$_{24}$ and (Ca$_{0.5}$Sr$_{0.5}$)(Ca$_{0.5}$Sr$_{0.5}$)Zr$_4$P$_6$O$_{24}$ determined by high temperature X-ray diffraction is shown in FIGS. 3 and 4. These Figures clearly show the low expansion and anisotropy of the intermediate composition.

Figure 5:
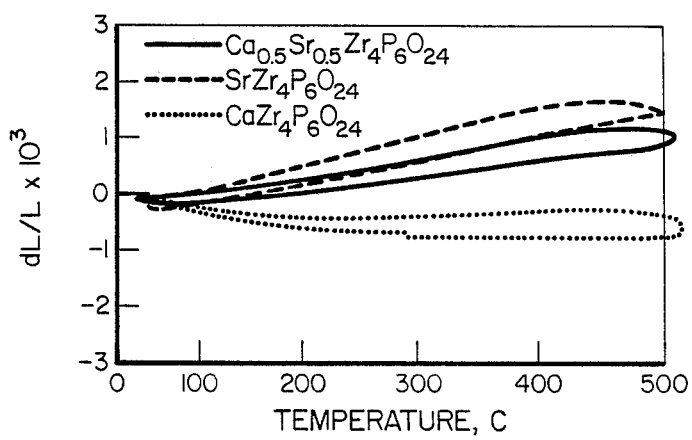

FIG. 5 shows a comparison of the bulk expansion and hysteresis for the Ca, Sr and Ca$_{0.5}$Sr$_{0.5}$ materials. Again, the solid solution shows near zero expansion. The low hysteresis is indicative of low anisotropy resulting in lesser microcracking and irreversible dimensional changes during the thermal cycle.

Solid solutions and diphasic mixtures with more than a minor substitution are expected to show the desired expansions. Compositions wherein 25-75 molar percent of the Ca is replaced by Ba and/or Sr are preferred. The most effective are the solid solutions or mixtures wherein Ca is replaced or present up to 25-50 mole percent. Sr is the more preferred substituent because the percentage of theoretical density of the resulting material is higher than the Ba substituted material under equivalent processing conditions.

We claim:

1. A polycrystalline material having low bulk thermal expansion and low anisotropy comprising a solid solution having a composition of Ca$_{1-x}$M$_x$Zr$_4$P$_6$O$_{24}$ or a diphasic mixture having a composition of $(1-x)$CaZr$_4$P$_6$O$_{24}$ + xMZ$_4$P$_6$O$_{24}$, wherein M is Ba and/or Sr and x is between about 0.25 and 0.75.

2. The polycrystalline material of claim 1 wherein x is between about 0.25 and 0.5.

3. The polycrystalline material of claim 1 wherein M is Sr.

4. The polycrystalline material of claim 3 wherein X is between about 0.25 and 0.5.

* * * * *